(12) United States Patent
Hirakata

(10) Patent No.: US 8,045,120 B2
(45) Date of Patent: Oct. 25, 2011

(54) LIQUID CRYSTAL PANEL AND EQUIPMENT COMPRISING SAID LIQUID CRYSTAL PANEL

(75) Inventor: Yoshiharu Hirakata, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 185 days.

(21) Appl. No.: 11/905,790

(22) Filed: Oct. 4, 2007

(65) Prior Publication Data

US 2008/0094543 A1    Apr. 24, 2008

Related U.S. Application Data

(60) Continuation of application No. 11/440,115, filed on May 25, 2006, now Pat. No. 7,289,184, which is a division of application No. 10/878,012, filed on Jun. 29, 2004, now Pat. No. 7,079,215, which is a division of application No. 09/985,042, filed on Nov. 1, 2001, now Pat. No. 6,771,347, which is a division of application No. 09/059,561, filed on Apr. 14, 1998, now Pat. No. 6,323,929.

(30) Foreign Application Priority Data

Apr. 24, 1997   (JP) .................................... 09-121747

(51) Int. Cl.
*G02F 1/1345* (2006.01)
(52) U.S. Cl. ...................................................... 349/151
(58) Field of Classification Search .................. 349/151, 349/153
See application file for complete search history.

(56) References Cited

U.S. PATENT DOCUMENTS

| | | | |
|---|---|---|---|
| 5,076,667 | A | 12/1991 | Stewart et al. |
| 5,148,301 | A | 9/1992 | Sawatsubashi et al. |
| 5,499,127 | A | 3/1996 | Tsubota et al. |
| 5,517,344 | A | 5/1996 | Hu et al. |
| 5,568,297 | A | 10/1996 | Tsubota et al. |
| 5,629,787 | A | 5/1997 | Tsubota et al. |
| 5,677,749 | A | 10/1997 | Tsubota et al. |
| 5,684,555 | A | 11/1997 | Shiba et al. |
| 5,764,320 | A | 6/1998 | Konuma et al. |

(Continued)

FOREIGN PATENT DOCUMENTS

EP             0 751 417            1/1997

(Continued)

OTHER PUBLICATIONS

Bahadur, "Liquid crystals: Applications and Uses," vol. 1, pp. 261-262.

(Continued)

*Primary Examiner* — James Dudek
(74) *Attorney, Agent, or Firm* — Eric J. Robinson; Robinson Intellectual Property Law Office, P.C.

(57) ABSTRACT

Non-uniformity of a cell gap of a liquid crystal panel is suppressed from affecting display adversely. Concentric interference fringes are unavoidably formed in a liquid crystal cell in which liquid crystal is sealed and the cell gap is maintained by a sealing member without using scattered spacers. Then, peripheral driving circuits are provided in regions where the interference fringes exist and a pixel matrix circuit is disposed in a region where no interference fringe exists. It is then possible to suppress the cell gap from affecting the display by determining the circuit configuration by parameterizing the interference fringes as described above.

20 Claims, 5 Drawing Sheets

U.S. PATENT DOCUMENTS

| | | |
|---|---|---|
| 5,815,231 A | 9/1998 | Nishi et al. |
| 5,933,204 A | 8/1999 | Fukumoto |
| 5,995,189 A | 11/1999 | Zhang |
| 6,191,435 B1 | 2/2001 | Inoue |
| 6,246,454 B1 | 6/2001 | Koyama et al. |
| 6,317,175 B1 | 11/2001 | Salerno et al. |
| 6,355,942 B1 | 3/2002 | Yamazaki et al. |
| 6,411,351 B1 | 6/2002 | Zhang et al. |
| 6,567,147 B1 | 5/2003 | Hirakata |
| 6,577,372 B2 | 6/2003 | Zhang et al. |
| 6,646,693 B2 | 11/2003 | Zhang et al. |
| 6,703,643 B2 | 3/2004 | Yamazaki et al. |
| 6,980,275 B1 | 12/2005 | Konuma et al. |
| 7,023,518 B1 | 4/2006 | Koyama et al. |
| 7,046,312 B2 | 5/2006 | Koyama et al. |
| 2006/0082718 A1 | 4/2006 | Yamazaki et al. |

FOREIGN PATENT DOCUMENTS

| | | |
|---|---|---|
| EP | 1 148 374 | 10/2001 |
| JP | 56-128919 | 10/1981 |
| JP | 01-134334 | 5/1989 |
| JP | 04-163425 | 6/1992 |
| JP | 05-165060 | 6/1993 |
| JP | 06-075233 | 3/1994 |
| JP | 06-250222 | 9/1994 |
| JP | 06-258661 | 9/1994 |
| JP | 08-306932 | 11/1996 |
| JP | 09-005758 | 1/1997 |
| JP | 09-022016 | 1/1997 |
| JP | 09-073103 | 3/1997 |

OTHER PUBLICATIONS

Office Action of May 31, 2005, Japanese Patent Office, JP 9-121747, 4 pages.

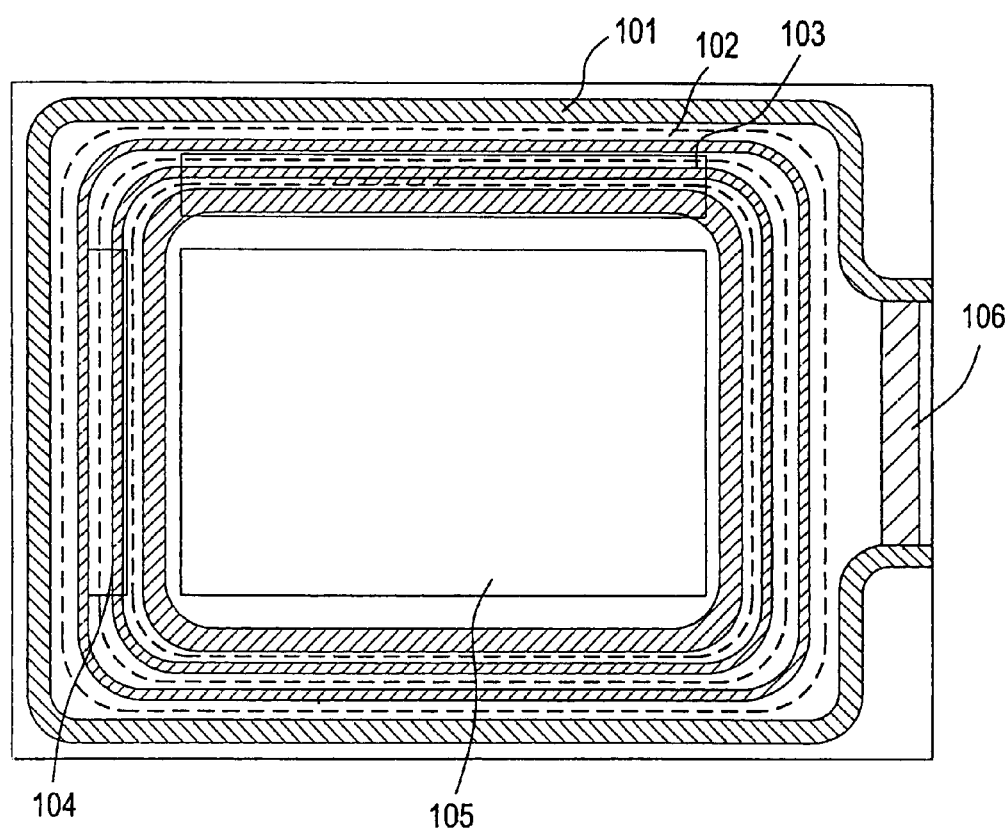

LIQUID CRYSTAL PANEL AND EQUIPMENT COMPRISING SAID LIQUID CRYSTAL PANEL

BACKGROUND OF THE INVENTION

1. Field of the Invention

The invention disclosed in the present specification relates to a liquid crystal panel which can display images favorably and to equipments using such liquid crystal panel.

2. Description of Related Art

There has been known an active matrix type liquid crystal display having a structure in which an active matrix circuit, a circuit for driving the active matrix circuit (referred to as a peripheral driving circuit) and other peripheral circuits (various circuits required for a liquid crystal panel) are integrated on one and the same substrate by TFTs. This structure is called a peripheral driving circuit integrated type liquid crystal display.

This structure is characterized in that:

(1) the whole construction may be simplified and miniaturized;

(2) its fabrication process may be simplified; and (3) it is advantageous in lowering power consumption.

Because it is required to reduce the size of the liquid crystal panel used in portable information processing terminals, a projector type liquid crystal display and the like, it is very useful to integrate the peripheral driving circuit to that end.

According to the finding of the inventors et. al., the existence of spacers which decide a thickness of a liquid crystal layer causes a problem in miniaturizing the liquid crystal panel.

For instance, because the size of a pixel is around 30 to 40 µm square or less in a small liquid crystal panel which is used for a projector and the like and whose size across corners is less than 2 inches, its display is influenced by the shadow of the spacers which exist within the unit pixel and whose diameter is several µm.

In order to solve such a problem, it is conceivable to arrange so as to maintain a cell gap (which is defined as corresponding to the thickness of the liquid crystal layer) by a sealing member (sealant) disposed so as to surround a pixel region (pixel matrix region), without using the spacers.

FIG. 2A schematically shows a transmission type liquid crystal panel which has been made in trial to observe a cell gap and whose screen size across corners is 1.4 inches. Because this liquid crystal panel is a prototype, no active matrix circuit nor peripheral driving circuit are formed.

In FIG. 2A, one denoted by the reference numeral 21 is a sealing member and liquid crystal is filled on the inside thereof. This liquid crystal panel is arranged such that the cell gap is maintained by a material called filler contained within the sealing member 21 and having a predetermined size.

No spacer for maintaining the cell gap is used in this liquid crystal panel. That is, no means for maintaining the cell gap is provided except of the region where the sealing member is provided.

A liquid crystal injection port 24 is closed by ultraviolet hardening resin or the like after injecting the liquid crystal. The reference numeral 23 denotes a glass substrate composing the liquid crystal panel. The figure shows a state in which two glass substrates overlap each other (the liquid crystal is maintained between these two glass substrates).

Because no spacer exists in the pixel region (inside of the sealing member 21 in this case) in this arrangement, no spacer affects the image quality.

However, when monochromic light is irradiated to the liquid crystal panel shown in FIG. 2A, concentric interference fringes 25 are observed from the region where the sealing member is provided to the center of the liquid crystal panel as shown in FIG. 2B.

The interference fringes 25 indicate that the interval of the cell gap is not uniform. That is, it indicates that the cell gap is narrow at the center part of the liquid crystal panel.

FIG. 3 is a schematic diagram wherein this state is stressed extremely. FIG. 3 shows a state in which liquid crystal 22 is interposed and maintained between a pair of substrates 201 and 202 by the sealing member 21. It also shows that a cell gap d is small at the center part 203 of the liquid crystal panel.

The interference fringes shown in FIG. 2B appear at part 204 where the positional variation of the cell gap is large. No interference fringe appears at the center part 203 of the liquid crystal cell because the cell gap barely varies there.

The interference fringes as shown in FIG. 2B is caused by interference of light reflected from the surface of the substrates composing the liquid crystal cell.

The principle of causing the interference fringes will be explained with reference to FIG. 4. FIG. 4 shows a state in which a pair of glass substrates 41 and 42 face each other while keeping the gap (corresponds to the cell gap) thereof inconstant.

When monochromic light 43 is input in such a state, light reflected by the back face of one glass substrate 41 interferes with light reflected on the surface of the other glass substrate 42 (although there exists other interferences, it is considered as such in order to simplify the discussion).

If the cell gap d is constant, i.e. if $d_1 = d_2 = d_3$, no bright and dark stripe pattern appears because the state of the interference is the same at any part.

However, when the gap d is different depending on locations, the bright and dark conditions differ depending on the locations, causing a stripe pattern in accordance to the state of changes of the gap d.

The stripe pattern is assumed to be caused when there is a difference of about $\lambda/2$ in the difference of the cell gap at each location.

When a cell gap at a first bright part is $d_1$ and a cell gap at a neighboring second bright part is $d_2$, a difference of an optical path length at those two locations is $2(d_2-d_1)$ considering that the light reciprocates in the cell gap.

The first and second bright conditions hold when there is a difference of about a wavelength $\lambda$ of the incident light 43 between the two optical path lengths.

Accordingly, an expression $\lambda = 2(d_2-d_1)$ holds. That is, the difference $(d_2-d_1)$ of the cell gap of the two bright parts is about $\lambda/2$.

Because the wavelength $\lambda$ of the incident light 43 is around 500 to 550 nm (0.5 to 0.55 µm) in general, the difference of the cell gaps is estimated to be around 0.25 µm.

Actually, because the state of reflection of light on the surface of glass is not so simple (it is complicated when an insulating film, a conductive film or the like is formed on the surface of the glass substrate) and wavelength of light within a liquid crystal material turns out to be $\lambda/n$ by refractive index n of the liquid crystal material when the liquid crystal material is filled therebetween, the above-mentioned difference of the cell gaps will be smaller than the estimated value.

In any case, the stripe pattern is observed when the cell gap varies in the order of about several tenth of visual light.

Generally, the cell gap of the liquid crystal panel is set around at 1 to 5 µm. This value is decided depending on operation modes or a liquid crystal material to be used.

However, when the cell gap of the liquid crystal panel deviates by 10% or more from the preset value, transmittancy of light transmitting through the liquid crystal changes by around 20% or more of the preset value.

Accordingly, when the liquid crystal panel wherein the interference fringes as shown in FIG. 2B are observed is fabricated by setting the cell gap at 3 μm and the whole of the inside of the sealing member is used as a display screen, a difference of cell gap in the order of μm is produced between the peripheral part and the center part of the screen.

This means that the state of display might differ remarkably at the peripheral part and the center part of the screen (in fact, a screen display whose image quality differs in the shape of donuts is observed).

Accordingly, it is an object of the invention disclosed in the present specification to solve the above-mentioned problem of non-uniformity of the cell gap in the liquid crystal panel.

SUMMARY OF THE INVENTION

The invention disclosed in the present specification is characterized in that a liquid crystal panel is constructed by taking in the existence of interference fringes as a design parameter by presupposing that the interference fringes are produced on the face of the liquid crystal panel when the liquid crystal panel is fabricated.

In concrete, a pixel matrix region is disposed while avoiding a region where the interference fringes are produced and peripheral driving circuits are disposed in the region where the interference fringes are produced.

It allows to prevent the existence of the interference fringes from affecting adversely the display even on the liquid crystal panel which causes the interference fringes. Further, because it allows the circuits to be disposed without wasted area within the liquid crystal cell, the equipment may be miniaturized to the minimum.

It is noted that although the region where the peripheral circuits are disposed is the region where the cell gap varies significantly depending on locations and there is a fear that it affects adversely the operation of the circuit, the variation of the cell gap in the level of causing the interference fringes depending on the locations causes no problem unless pressure is directly applied on the peripheral circuit itself.

One of the inventive liquid crystal panel disclosed in the present specification is characterized in that liquid crystal is interposed and held between a pair of substrates; the liquid crystal is sealed within a predetermined region by a sealing member; a thickness of a liquid crystal layer is maintained by the sealing member; the liquid crystal layer has non-uniformity with respect to its thickness, thus causing interference fringes; an active matrix circuit is provided in a region where no interference fringe appears; and peripheral circuits are provided in regions where the interference fringes appear.

The above-mentioned structure is not limited specifically in terms of types of liquid crystal material and operation modes.

The interference fringes are what are produced when monochromic light is irradiated to the liquid crystal panel.

The peripheral circuits include a circuit for simply driving the active matrix circuit.

A structure of another inventive liquid crystal panel is characterized in that liquid crystal is interposed and held between a pair of substrates; the liquid crystal is sealed within a predetermined region by a sealing member; a thickness of a liquid crystal layer is maintained by the sealing member; the liquid crystal layer has non-uniformity with respect to its thickness, thus causing interference fringes; the interference fringes are shaped concentrically; an active matrix circuit is provided on the inside of regions where the concentric interference fringes appear; and peripheral circuits are provided in regions where the interference fringes appear.

A structure of a still other inventive liquid crystal panel is characterized in that liquid crystal is interposed and held between a pair of substrates; the liquid crystal is sealed within a predetermined region by a sealing member; a thickness of a liquid crystal layer is maintained by the sealing member; the liquid crystal layer has non-uniformity with respect to its thickness, thus causing interference fringes; the interference fringes are shaped concentrically; an active matrix circuit is provided in a region where no interference fringe appears at the center part of the concentric interference fringes; and peripheral circuits are provided in regions where the interference fringes appear.

Preferably, each invention described above is applied to one in which the thickness of the liquid crystal layer is maintained only by the sealing member. That is, the invention disclosed in the present specification is effective especially when no means for maintaining the thickness of the liquid crystal layer is provided on the inside of the sealing member.

It is because concentric interference fringes as indicated by the reference numeral 102 in FIG. 1 are liable to appear specifically in such a case.

The concentric shape described above means a shape in which a plurality of graphics having almost the same center and having different sizes exist. It is the state in which a plurality of graphics having an approximately rectangular shape (whose corners are rounded) as indicated by the reference numeral 102 in FIG. 1 exist.

The liquid crystal panel may be either a transmission type or reflection type liquid crystal panel in the invention disclosed in the present specification.

The specific nature of the invention, as well as other objects, uses and advantages thereof, will clearly appear from the following description and from the accompanying drawings.

BRIEF DESCRIPTION OF DRAWINGS

FIG. 1 is a schematic diagram showing a state wherein a liquid crystal panel of one embodiment is seen from the top;

DESCRIPTION OF PREFERRED EMBODIMENTS

Figure 2A:
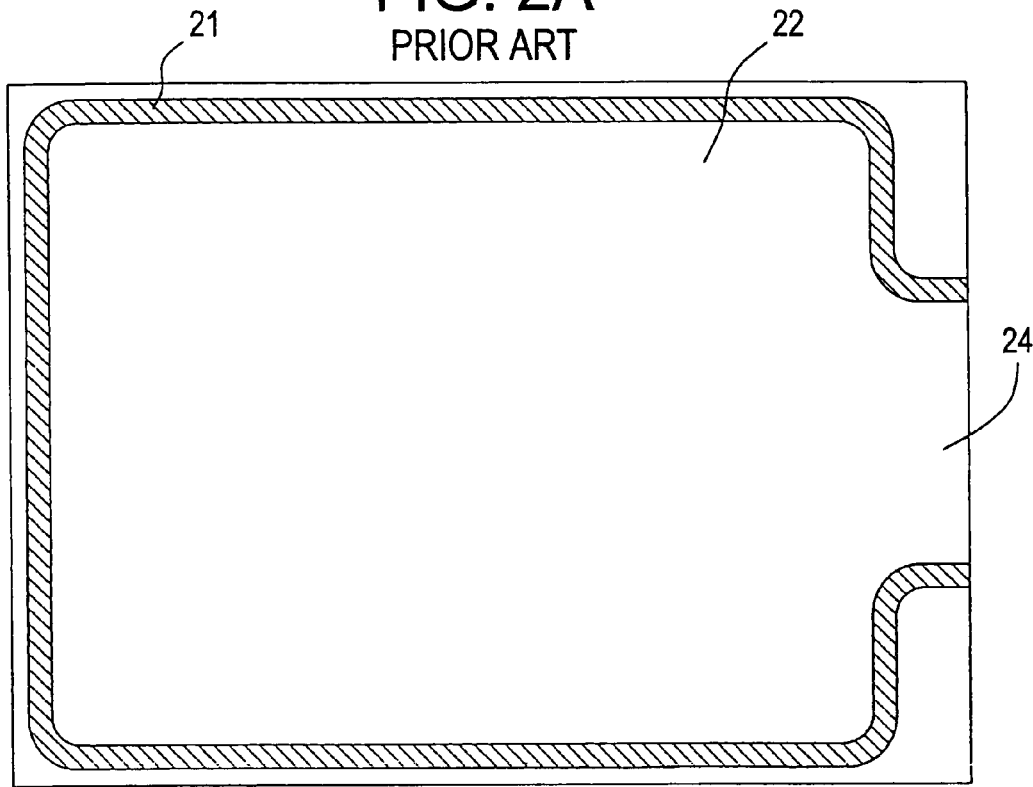
FIGS. 2A and 2B are diagrams showing a structure of a liquid crystal.
Figure 2B:
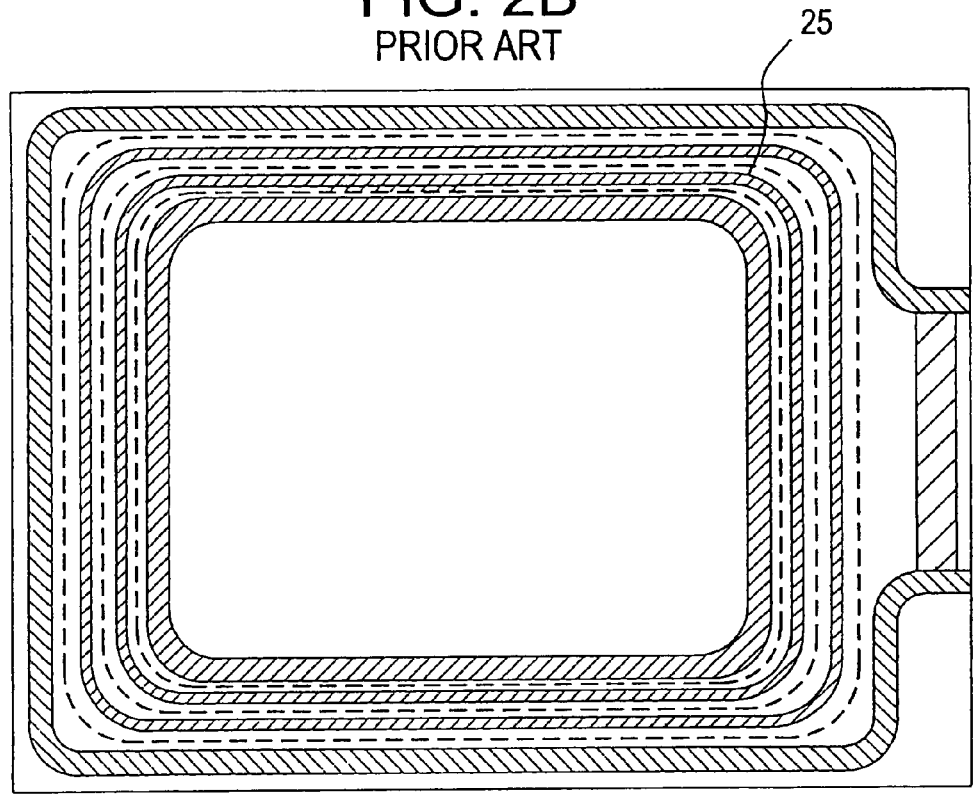
Figure 3:
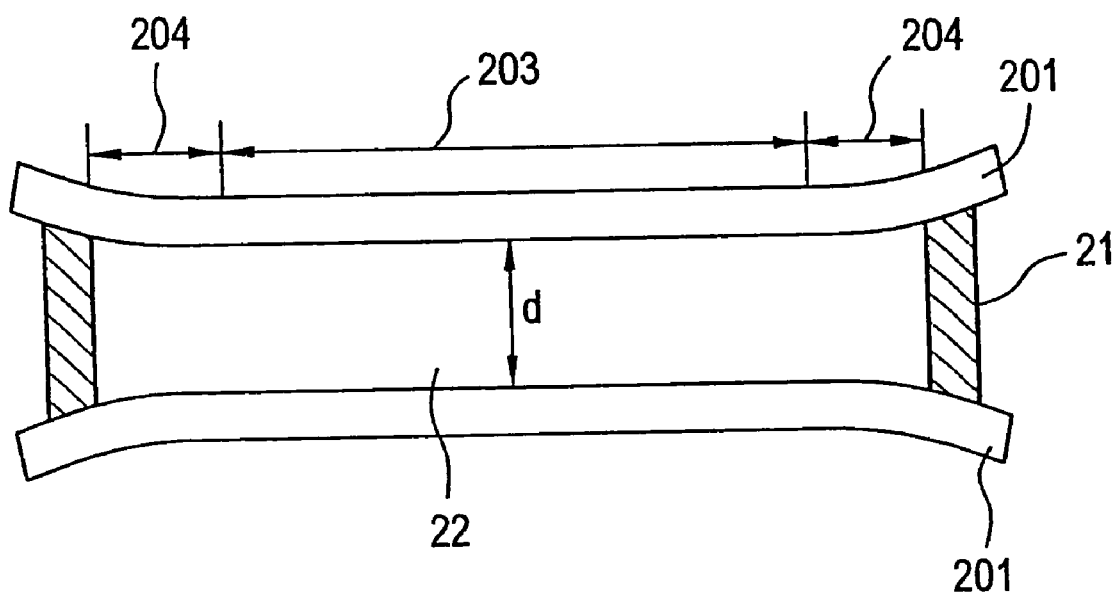
FIG. 3 is a schematic diagram showing a state of a cell gap of the liquid crystal panel.
Figure 4:
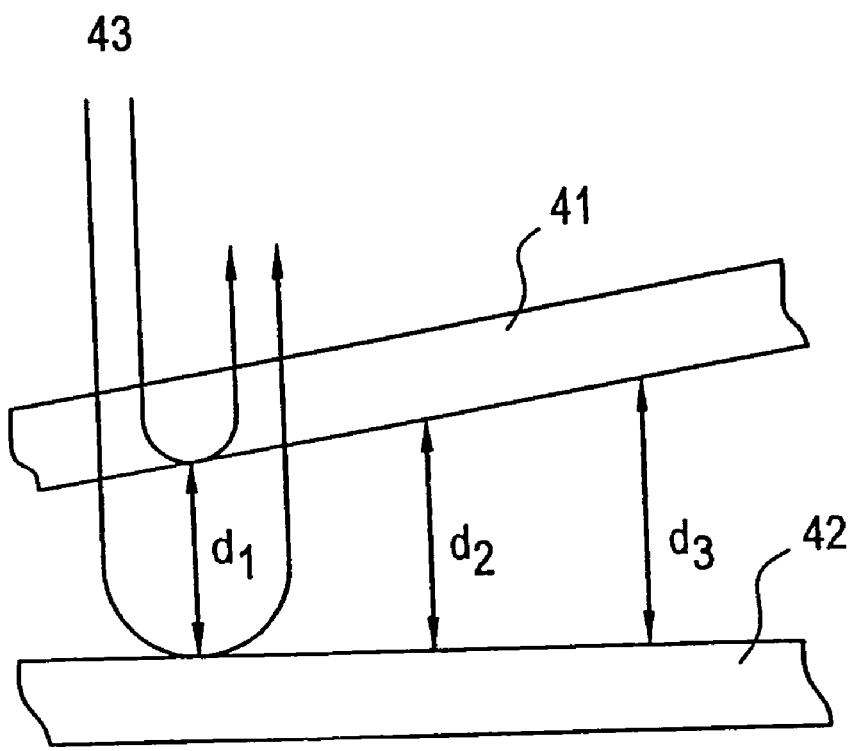
FIG. 4 is a diagram illustrating a principle of causing interference fringes.

The invention disclosed in the present specification is characterized in that observed interference fringes which are caused by non-uniformity of cell gap (corresponds to a thickness of a liquid crystal layer) of a liquid crystal panel are taken in as design parameters to utilize it in the construction of the liquid crystal cell.

In concrete, in the liquid crystal panel as shown in FIG. 1, an active matrix circuit 105 is disposed on the inside of regions where interference fringes 102 exist and peripheral circuits are disposed in the regions where the interference fringes 102 exist.

Thereby, it is possible to prevent the interference fringes 102 from appearing in the display even if the panel has such a structure of causing the interference fringes 102.

This invention is effective especially to the liquid crystal panel having a structure in which the thickness of the liquid crystal layer (cell gap) is decided by a sealing member 101 as shown in FIG. 1.

First Embodiment

FIG. 1 shows the scheme (schematic diagram of an upper face) of the liquid crystal panel utilizing the invention disclosed in the present specification.

In the arrangement shown in FIG. 1, the reference numeral 101 denotes the sealing member. The cell gap of the liquid crystal panel shown in FIG. 1 is maintained by a material called filler contained within the sealing member 101. No spherical spacer or the like is used within a pixel matrix 105.

Liquid crystal is filled on the inside of the sealing member 101. An injection port 106 of the liquid crystal is closed by ultraviolet hardening resin in the state shown in the figure.

A pattern 102 of interference fringes appears when visual light is irradiated. What is important in the arrangement shown in FIG. 1 is that the pixel matrix region 105 is provided not in the region where the stripe pattern appears but in the region where no stripe pattern exists.

That is, because the region where the interference fringes exist is the location where the cell gap varies significantly (the cell gap varies to the level of influencing the display), it is not used as the screen and peripheral circuits are disposed in the regions where the interference fringes exist, i.e. in the optically dead space.

In FIG. 1, there are peripheral driving circuits 103 and 104 for driving the pixel matrix 105. Because a circuit composed of a shift register, a switch and a buffer is utilized as the peripheral circuit here, the peripheral circuit will be referred to as a peripheral driving circuit.

The peripheral driving circuits 103 and 104 are provided in the region 102 where the stripe pattern is formed. The cell gap varies with a distance of about ½ or less of a wavelength of visual light with respect to the intervals of the stripes in the region where the stripe pattern is formed. That is, it varies in the order of about 0.25 μm or more.

This situation may be considered that the thickness of the liquid crystal layer also varies in the order of about 0.25 μm or more. Accordingly, it may be considered that the thickness of the liquid crystal layer varies in the order of about 0.25 μm or more in the region where the stripe pattern exists.

Transmittancy of light transmitting through the liquid crystal layer varies considerably depending on the thickness of the liquid crystal layer. The thickness of the liquid crystal layer is changing sharply where the stripe pattern is condensed. Accordingly, the transmittancy of light also varies significantly depending on locations in this region.

In the arrangement shown in FIG. 1, the pixel matrix region is disposed while avoiding the region where the thickness of the liquid crystal layer varies significantly (i.e. the region where the stripe pattern is formed).

It allows the influence of the significant changes of the thickness of the liquid crystal layer, which varies depending on locations, on the screen display to be eliminated.

Basically, it is impossible to avoid the stripe pattern as shown by the reference numeral 102 when it is arranged to maintain the cell gap only by the sealing member (although there is a method of utilizing a special glass substrate having a high rigidity, it is expensive and is not practical).

Accordingly, it is useful to adopt the circuit configuration as illustrated in the present embodiment presupposing that there exists the state of the cell gap in which the interference fringes 102 are produced.

Second Embodiment

Equipments comprising the liquid crystal panel utilizing the present invention will be exemplified in the present embodiment. Such equipments include a video camera, a digital still camera, a head-mount display, a car-navigation system, a personal computer and a portable information terminal (a mobile computer, a portable telephone and the like).

Figure 5A:
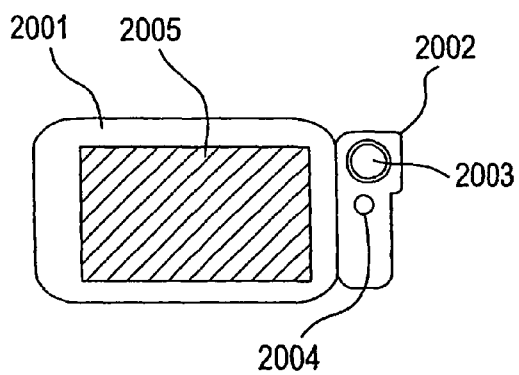
FIGS. 5A through 5F show equipments utilizing the liquid crystal panel.

FIG. 5A shows a mobile computer comprising a main body 2001, a camera section 2002, a receiver section 2003, control switches 2004 and a liquid crystal panel 2005. The type of the liquid crystal panel 2005 may be either a reflection type or a transmission type.

Figure 5B:
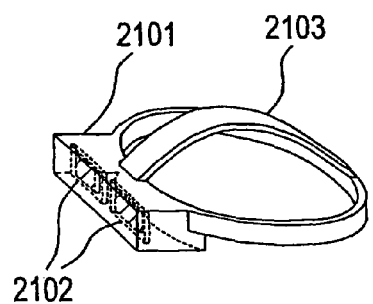

FIG. 5B shows a head-mount display comprising a main body 2101, a reflection type liquid crystal panel 2102 and a band section 2103.

Figure 5C:
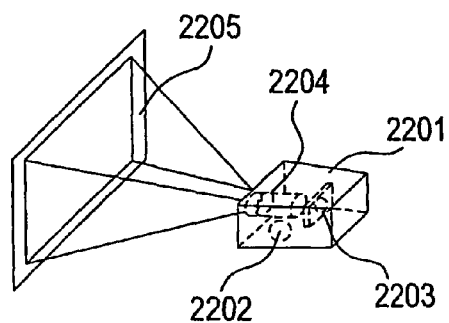

FIG. 5C shows a front projection type liquid crystal panel. This equipment is arranged so as to guide light from a light source 2202 to a reflection type liquid crystal panel 2203 by an optical system 2204 and to project images optically modulated by the liquid crystal panel 2203 to a screen 2205 by enlarging by the optical system 2204. This type of projection requires the screen 2205 beside a main body 2201.

Figure 5D:
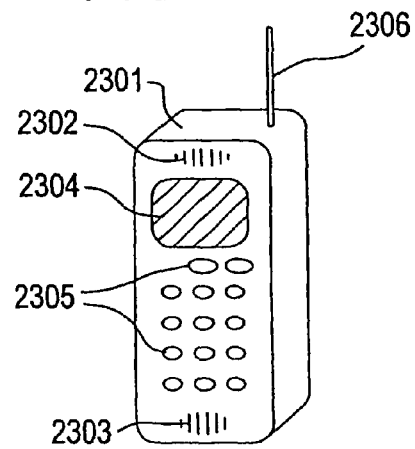

FIG. 5D shows a portable telephone comprising a main body 2301, a voice output section 2302, a voice input section 2303, a liquid crystal display 2304, control switches 2305 and an antenna 2306.

Figure 5E:
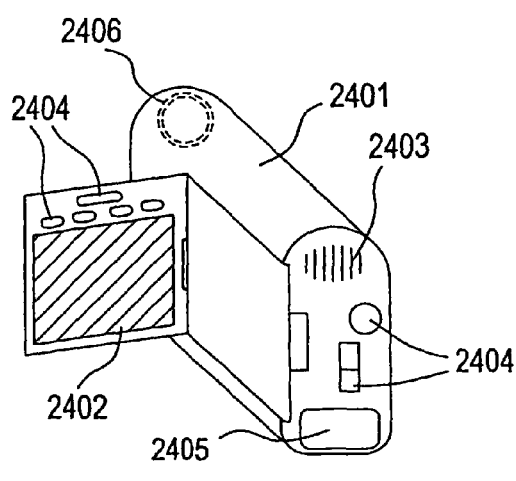

FIG. 5E shows a video camera comprising a main body 2401, a liquid crystal display 2402, a voice input section 2403, control switches 2404, a battery 2405 and a receiver section 2406.

Figure 5F:
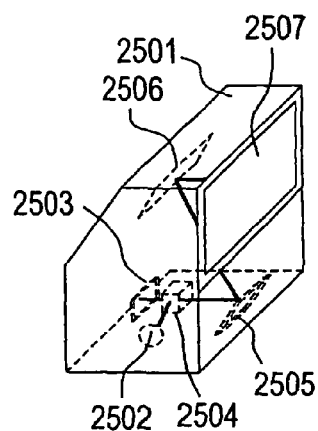

FIG. 5F shows an equipment called a rear-projection type projector. This equipment is arranged so as to optically modulate light emitted from a light source 2502 by a polarization beam splitter 2504 on a reflection type liquid crystal panel 2503 and to reflect it by reflectors 2505 and 2506 to project to a screen 2507. The screen 2507 is disposed within a main body 2502 in this type of equipment.

Accordingly, it is possible to provide the liquid crystal panel in which the influence of the non-uniformity of the cell gap will not appear in the display even if it exists by utilizing the invention disclosed in the present specification.

While the preferred embodiments have been described, variations thereto will occur to those skilled in the art within the scope of the present inventive concepts which are delineated by the following claims.

What is claimed is:

1. A liquid crystal panel comprising:
   a first substrate and a second substrate opposed to each other, and having a gap therebetween;
   a first region containing a pixel matrix circuit and a second region excluding the first region, both formed over the first substrate; and
   a liquid crystal material between the first substrate and the second substrate,
   wherein a transmittancy of a light which goes through the first region is different from a transmittancy of a light which goes through the second region, and
   wherein no spacer is provided between the first substrate and the second substrate.

2. A liquid crystal panel according to claim 1, wherein a driving circuit is provided in the second region.

3. A liquid crystal panel according to claim 1, wherein the liquid crystal panel is a transmission type liquid crystal panel.

4. A liquid crystal panel according to claim 1, wherein the liquid crystal panel is a reflection type liquid crystal panel.

5. A liquid crystal panel according to claim 1, wherein the liquid crystal panel is incorporated in one selected from the group consisting of a mobile computer, a head-mount display, a video camera, a projector and a portable telephone.

6. A liquid crystal panel comprising:
a first substrate and a second substrate opposed to each other, and having a gap from 1 to 5 μm therebetween;
a first region containing a pixel matrix circuit and a second region excluding the first region, both formed over the first substrate; and
a liquid crystal material between the first substrate and the second substrate,
wherein a transmittancy of a light which goes through the first region is different from a transmittancy of a light which goes through the second region, and
wherein no spacer is provided between the first substrate and the second substrate.

7. A liquid crystal panel according to claim 6, wherein a driving circuit is provided in the second region.

8. A liquid crystal panel according to claim 6, wherein the liquid crystal panel is a transmission type liquid crystal panel.

9. A liquid crystal panel according to claim 6, wherein the liquid crystal panel is a reflection type liquid crystal panel.

10. A liquid crystal panel according to claim 6, wherein the liquid crystal panel is incorporated in one selected from the group consisting of a mobile computer, a head-mount display, a video camera, a projector and a portable telephone.

11. A liquid crystal panel comprising:
a first substrate and a second substrate opposed to each other, and having a gap therebetween;
a first region containing a pixel matrix circuit and a second region excluding the first region, both formed over the first substrate; and
a liquid crystal material between the first substrate and the second substrate,
wherein a transmittancy of a light which goes through the first region is different from a transmittancy of a light which goes through the second region,
wherein the liquid crystal panel has a size across corners of less than 2 inches, and
wherein no spacer is provided between the first substrate and the second substrate.

12. A liquid crystal panel according to claim 11, wherein a driving circuit is provided in the second region.

13. A liquid crystal panel according to claim 11, wherein the liquid crystal panel is a transmission type liquid crystal panel.

14. A liquid crystal panel according to claim 11, wherein the liquid crystal panel is a reflection type liquid crystal panel.

15. A liquid crystal panel according to claim 11, wherein the liquid crystal panel is incorporated in one selected from the group consisting of a mobile computer, a head-mount display, a video camera, a projector and a portable telephone.

16. A liquid crystal panel comprising:
a first substrate and a second substrate opposed to each other, and having a gap from 1 to 5 μm therebetween;
a first region containing a pixel matrix circuit and a second region excluding the first region, both formed over the first substrate; and
a liquid crystal material between the first substrate and the second substrate,
wherein a transmittancy of a light which goes through the first region is different from a transmittancy of a light which goes through the second region,
wherein the liquid crystal panel has a size across corners of less than 2 inches, and
wherein no spacer is provided between the first substrate and the second substrate.

17. A liquid crystal panel according to claim 16, wherein a driving circuit is provided in the second region.

18. A liquid crystal panel according to claim 16, wherein the liquid crystal panel is a transmission type liquid crystal panel.

19. A liquid crystal panel according to claim 16, wherein the liquid crystal panel is a reflection type liquid crystal panel.

20. A liquid crystal panel according to claim 16, wherein the liquid crystal panel is incorporated in one selected from the group consisting of a mobile computer, a head-mount display, a video camera, a projector and a portable telephone.

* * * * *